United States Patent
Itoh (10) Patent No.: US 11,835,900 B2
(45) Date of Patent: Dec. 5, 2023

(54) MOTOR CONTROL APPARATUS THAT CONTROLS MOTOR, BASED ON COMMAND VALUES OF EXCITATION CURRENT AND OF TORQUE CURRENT, AND IMAGE FORMING APPARATUS

(71) Applicant: CANON KABUSHIKI KAISHA, Tokyo (JP)

(72) Inventor: Masatoshi Itoh, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 17/701,869

(22) Filed: Mar. 23, 2022

(65) Prior Publication Data

US 2022/0308514 A1    Sep. 29, 2022

(30) Foreign Application Priority Data

Mar. 26, 2021 (JP) ................. 2021-053630

(51) Int. Cl.
*H02P 21/18* (2016.01)
*H02P 21/22* (2016.01)
(Continued)

(52) U.S. Cl.
CPC ..... *G03G 15/5008* (2013.01); *G03G 15/5004* (2013.01); *G03G 15/80* (2013.01);
(Continued)

(58) Field of Classification Search
CPC .......... H02P 21/24; H02P 21/34; H02P 6/186; H02P 6/185; H02P 6/182; H02P 21/18;
(Continued)

(56) References Cited

U.S. PATENT DOCUMENTS

2010/0327797 A1* 12/2010 Maeda ............... H02P 6/20
399/53
2015/0145454 A1* 5/2015 Kameyama ........ G03G 15/5008
318/400.34
(Continued)

FOREIGN PATENT DOCUMENTS

JP    H08223970 A    8/1996
JP    2015094253 A   5/2015
(Continued)

*Primary Examiner* — Kawing Chan
*Assistant Examiner* — Gabriel Agared
(74) *Attorney, Agent, or Firm* — ROSSI, KIMMS & McDOWELL LLP (57) ABSTRACT

A motor control apparatus includes: a current supply unit configured to supply coil current to a plurality of coils of a motor by controlling, based on a first command value of excitation current and a second command value of torque current, voltage to be applied to the plurality of coils; a first setting unit configured to set the first command value; a second setting unit configured to set the second command value; and a control unit configured to use first control in starting of rotation of a rotor of the motor, and switch control to second control after rotation speed of the rotor becomes greater than predetermined speed. The first setting unit is further configured to set a value greater than 0 as the first command value before the control unit switches control from the first control to the second control.

9 Claims, 9 Drawing Sheets

(51) Int. Cl.
*G03G 15/00* (2006.01)
*H02P 6/185* (2016.01)
*H02P 6/18* (2016.01)
*H02P 6/182* (2016.01)

(52) U.S. Cl.
CPC .............. *H02P 6/185* (2013.01); *H02P 6/186* (2013.01); *H02P 6/182* (2013.01)

(58) Field of Classification Search
CPC . G03G 15/5008; G03G 15/80; G03G 15/5004
USPC ........................................................ 318/432
See application file for complete search history.

(56) References Cited

U.S. PATENT DOCUMENTS

| | | | |
|---|---|---|---|
| 2019/0319565 A1* | 10/2019 | Aoki | ...................... H02P 21/34 |
| 2019/0319566 A1* | 10/2019 | Kawamura | ............. H02P 21/22 |
| 2019/0341866 A1* | 11/2019 | Fujimori | ............ G03G 15/6558 |
| 2019/0356252 A1* | 11/2019 | Kameyama | ............. H02P 6/186 |
| 2020/0195181 A1* | 6/2020 | Yoshikawa | ........ G03G 15/5008 |

FOREIGN PATENT DOCUMENTS

| | | | |
|---|---|---|---|
| JP | 2015104263 A | | 6/2015 |
| JP | 2019068586 A | | 4/2019 |

* cited by examiner

MOTOR CONTROL APPARATUS THAT CONTROLS MOTOR, BASED ON COMMAND VALUES OF EXCITATION CURRENT AND OF TORQUE CURRENT, AND IMAGE FORMING APPARATUS

BACKGROUND OF THE INVENTION

Field of the Invention

The present invention relates to a control technique of a motor.

Description of the Related Art

As a drive source of an image forming apparatus, a sensorless type motor not equipped with a sensor that detects a rotor position is used. A motor control apparatus that controls a sensorless type motor first detects a stop position (rotation phase of the rotor that is stopped) of a rotor by a predetermined method when activating the motor. US-2015-145454 discloses a configuration where a stop position of a rotor is detected by using a property in which an inductance value of a coil of a motor changes in accordance with the stop position of the rotor. The motor control apparatus starts driving of the motor by forced commutation control, based on the stop position detected of the rotor. When rotation speed of the rotor becomes equal to or greater than predetermined speed, as described Japanese Patent Laid-Open No. 08-223970, the motor control apparatus can detect a rotation position (rotation phase) and rotation speed of the rotor by induced voltage occurring in the coil. Therefore, the motor control apparatus switches a control method from forced commutation control to sensorless control after the rotation speed of the rotor becomes equal to or greater than the predetermined speed.

In the forced commutation control, the rotation speed of the rotor may be overshot or undershot with respect to command speed. When the control method is switched from the forced commutation control to the sensorless control in a state of overshooting or undershooting with respect to the command speed, coil current flowing to the coil of the motor may be narrowed excessively by feedback control that is performed in the sensorless control. When the coil current is excessively narrowed, detection of the rotation position and the rotation speed of the rotor in the sensorless control becomes unstable, and as a result, activation of the motor may become unstable.

SUMMARY OF THE INVENTION

According to a present disclosure, a motor control apparatus includes: a current supply unit configured to supply coil current to a plurality of coils of a motor by controlling, based on a first command value of excitation current and a second command value of torque current, voltage to be applied to the plurality of coils; a first setting unit configured to set the first command value; a second setting unit configured to set the second command value; and a control unit configured to use first control in starting of rotation of a rotor of the motor, and switch control to second control after rotation speed of the rotor becomes greater than predetermined speed, wherein the first setting unit is further configured to set a value greater than 0 as the first command value before the control unit switches control from the first control to the second control.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1:
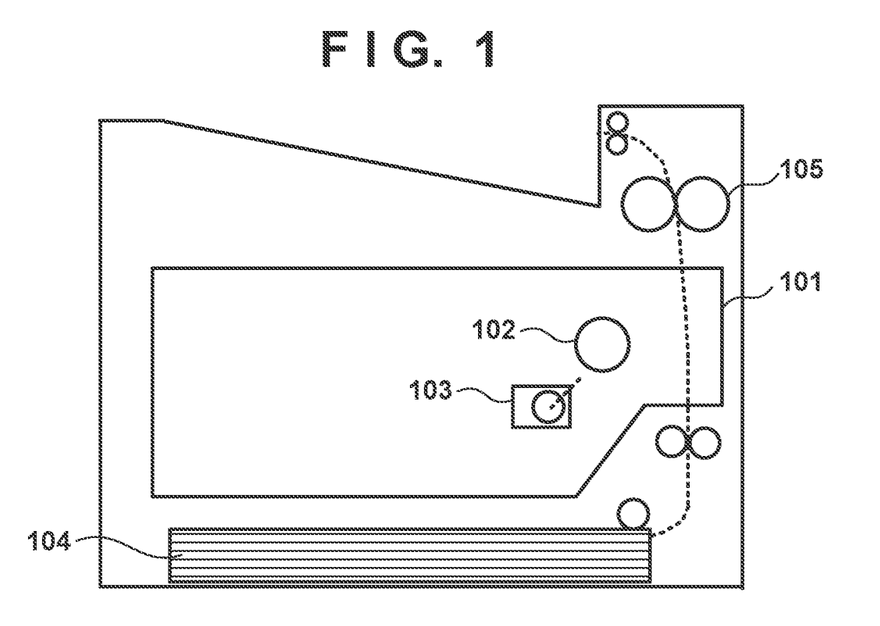
FIG. 1 is a configuration diagram of an image forming apparatus according to an embodiment.

The present embodiments will be explained below with reference to an image forming apparatus as an example of a motor control apparatus. Note that the present invention is not limited to the image forming apparatus, and can be applied to an arbitrary motor control apparatus that controls a sensorless type motor. FIG. 1 is a configuration diagram of an image forming apparatus according to the present embodiment. The image forming apparatus may be, for instance, a printer, a copier, a multifunction machine, a facsimile, or the like. An image forming unit 101 forms a toner image on a photoreceptor 102. The image forming unit 101 has a charging unit, an exposure unit, a development unit and the like for forming a toner image on the photoreceptor 102. The image forming unit 101 transfers the toner image of the photoreceptor 102 to a sheet conveyed along a conveyance path from a cassette 104. Subsequently, the sheet is heated and pressurized in a fixing unit 105, and the toner image is fixed. After the fixing of the toner image, the sheet is discharged to the outside of the image forming apparatus. A sensorless motor (hereinafter, simply referred to as a motor) 103 is a drive source that generates driving force for driving the photoreceptor 102. However, a load driven by the motor 103 is not limited, and the present disclosure can be applied to control of the motor 103 that drives an arbitrary load (member) in the image forming apparatus.

Figure 2:
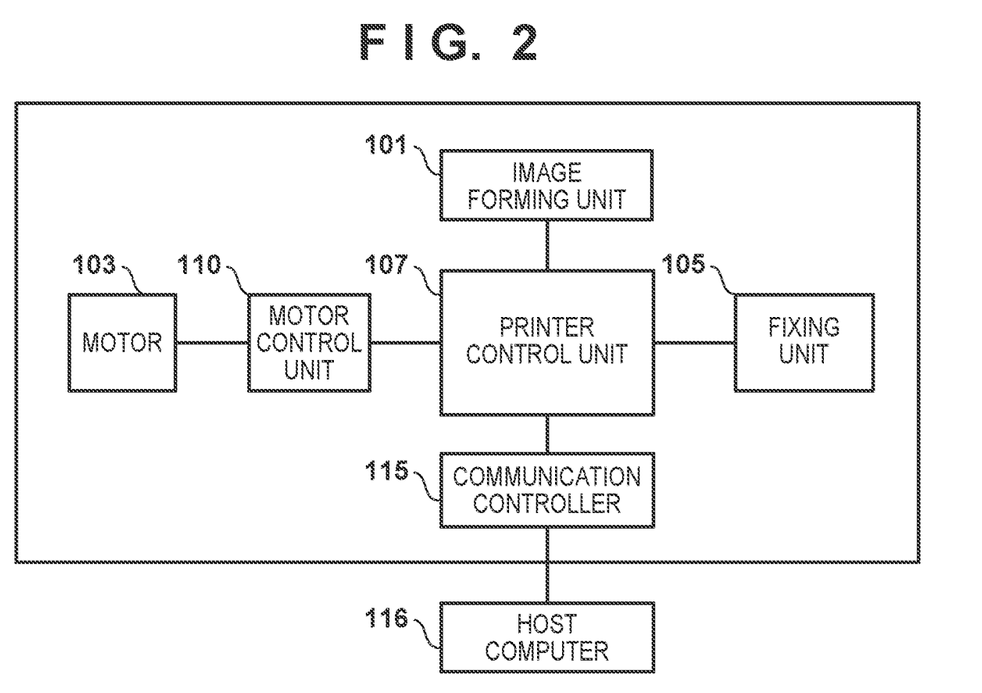
FIG. 2 is a control configuration diagram of an image forming apparatus according to an embodiment.

FIG. 2 illustrates a control configuration of the image forming apparatus. A printer control unit 107 entirely controls the image forming apparatus including the image forming unit 101 and the fixing unit 105 described above. The printer control unit 107 has a processor (not illustrated), and a memory that stores a program and various kinds of control data. The processor of the printer control unit 107 executes a program stored in the memory of the printer control unit 107, and thus performs various kinds of processing for controlling the image forming apparatus. Note that in so doing, the printer control unit 107 uses the control data stored in the memory. A communication controller 115 communicates with a host computer 116 and receives image data of an image formed by the image forming apparatus from the host computer 116. A motor control unit 110 controls the motor 103 under control of the printer control unit 107.

Figure 3:
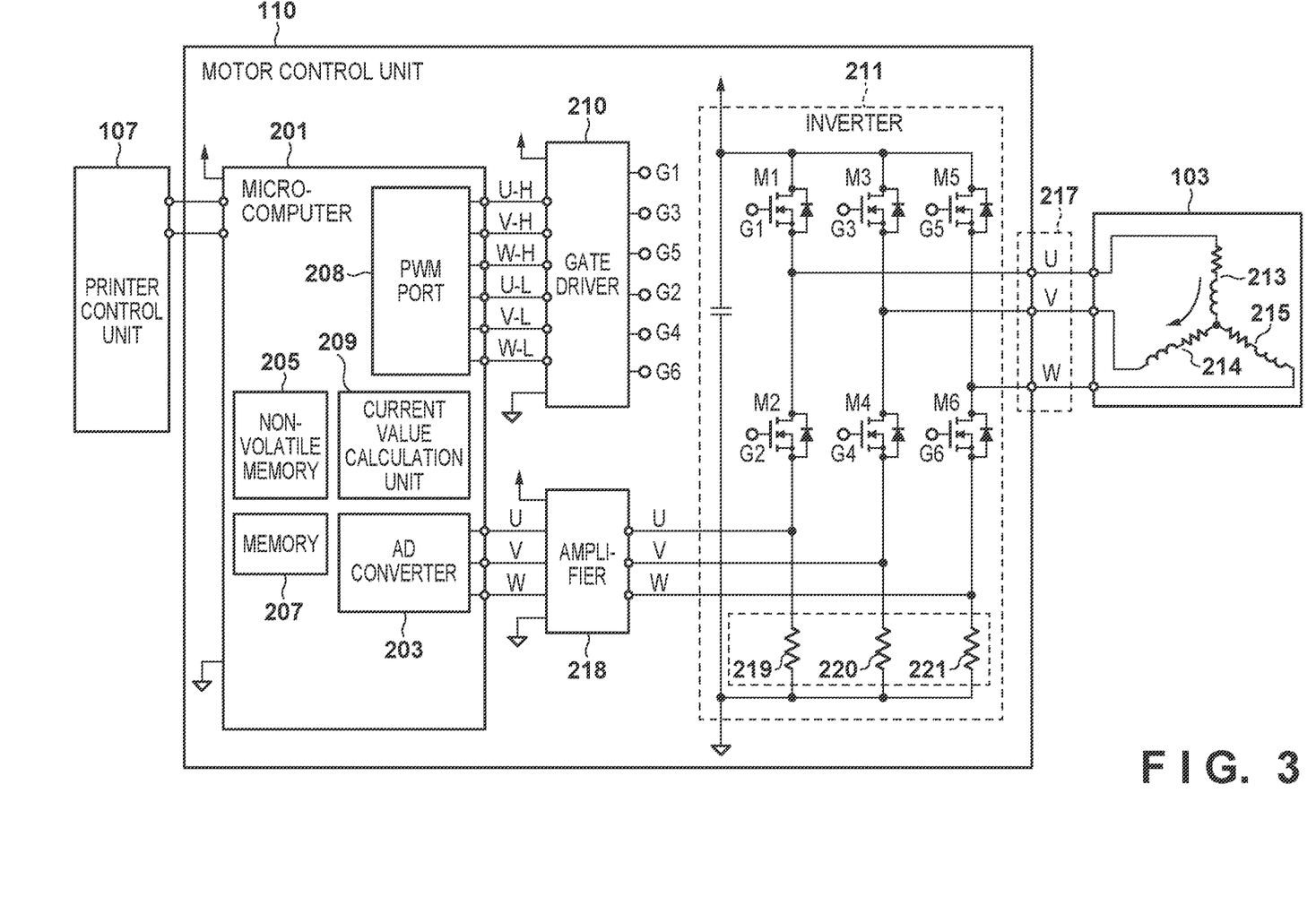
FIG. 3 is a configuration diagram of a motor control unit according to an embodiment.

FIG. 3 illustrates a control configuration of the motor 103. The motor control unit 110 communicates with the printer control unit 107 and controls the motor 103 under control of the printer control unit 107. A nonvolatile memory 205 of a microcomputer 201 stores a program executed by the microcomputer 201 and various kinds of data used for control of the motor 103. A memory 207 is used by the microcomputer 201 for temporary data storage. A PWM port 208 has a total of six terminals for outputting two PWM signals (high side and low side) with respect to each of three phases (U, V, and W) of the motor 103. That is, the PWM port 208 has three terminals of the high side (U-H, V-H, and W-H) and three terminals of the low side (U-L, V-L, and W-L).

An inverter 211 has switching elements M1, M3, and M5 of the high side and switching elements M2, M4, and M6 of the low side, for each of the three phases of the motor 103. In FIG. 3, the switching elements M1 and M2 are U-phase switching elements, the switching elements M3 and M4 are V-phase switching elements, and the switching elements M5 and M6 are W-phase switching elements. As the switching element, for instance, a transistor or an FET can be used. A gate driver 210 controls ON/OFF of the corresponding switching element, based on the PWM signal from the PWM port 208. For instance, the gate driver 210 controls ON/OFF of the switching element M1 by controlling applied voltage to a gate G1 of the switching element M1, based on the PWM signal output from the U-H terminal.

U-, V-, and W-phase outputs 217 of the inverter 211 are connected to coils 213 (U-phase), 214 (V-phase), and 215 (W-phase) of the motor 103. Coil current flowing through each of the coils 213, 214, and 215 can be controlled by controlling ON/OFF of each of the switching elements. In this manner, the inverter 211 functions as a current supply unit that supplies the coil current to each of the coils 213, 214, and 215. The coil current flowing through each of the coils 213, 214, and 215 is converted into voltage by current detection resistors 219, 220, and 221. An amplifier 218 amplifies the voltage of the current detection resistors 219, 220, and 221 corresponding to the coil current, and outputs amplified voltage to an AD converter 203 of the microcomputer 201. The AD converter 203 converts the voltage output by the amplifier 218 into a digital value. A current value calculation unit 209 determines coil current of each of the phases, based on the digital value output by the AD converter 203.

Figure 4:
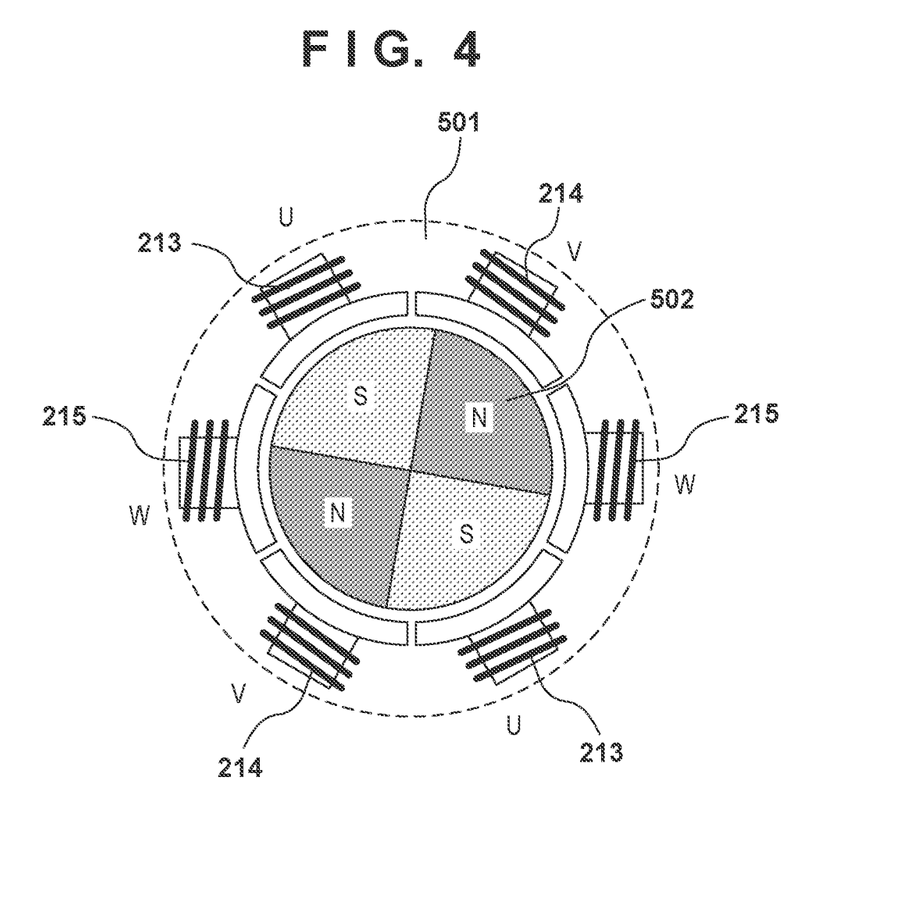
FIG. 4 is a configuration diagram of a motor according to an embodiment.

FIG. 4 is a configuration diagram of the motor 103. The motor 103 has a stator 501 having six slots, and a rotor 502 having four poles. The stator 501 has the U-phase coil 213, the V-phase coil 214, and the W-phase coil 215. The rotor 502 is constituted by a permanent magnet. A rotation phase of the rotor 502 is defined based on the case where the rotor 502 is in a predetermined state. As an example, as illustrated in FIG. 4, based on a state in which the S pole of the rotor 502 faces the U-phase coil 213, that is, based on an electric angle of 0, an electric angle can be defined as increasing counterclockwise. In the present embodiment, since the number of the poles of the rotor 502 is four, in a case where the rotor rotates counterclockwise by a mechanical angle of $\pi/2$ from the state of FIG. 4, an electric angle becomes $\pi$.

Figure 5:
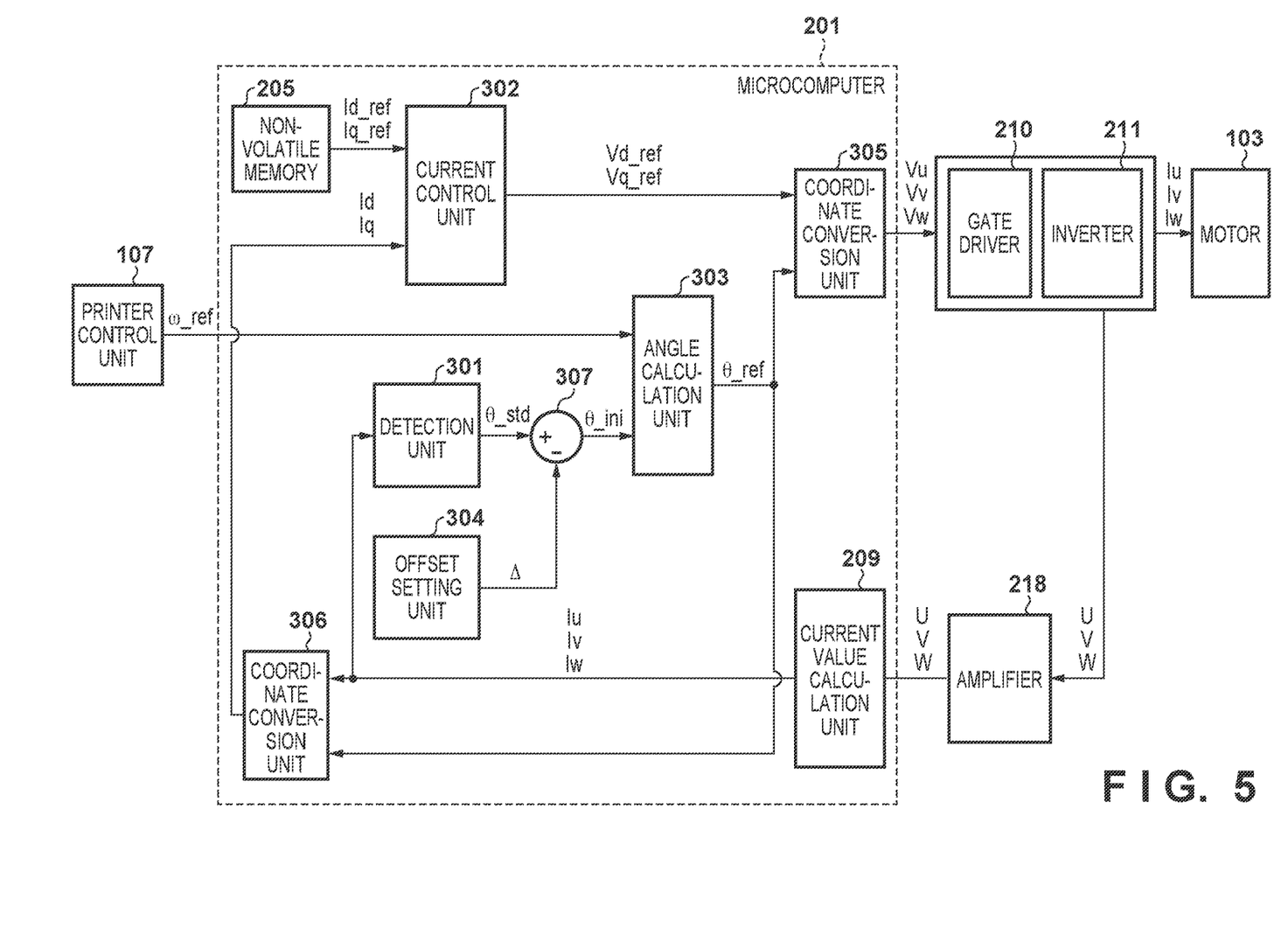
FIG. 5 is a functional block diagram of a microcomputer in forced commutation control, according to an embodiment.

FIG. 5 is a functional block diagram of the microcomputer 201 in forced commutation control. Note that in the present embodiment, the microcomputer 201 vector-controls the motor 103. A current control unit 302 acquires a command value Id_ref of excitation current and a command value Iq_ref of torque current that are stored in advance in the nonvolatile memory 205. Additionally, a measurement value Id of excitation current and a measurement value Iq of torque current are input from a coordinate conversion unit 306 to the current control unit 302. Note that the excitation current refers to a component in coil current that contributes to generation of a magnetic flux, and the torque current refers to a component in coil current that contributes to output torque. Based on these values, the current control unit 302 outputs voltage command values Vd_ref and Vq_ref in a rotating coordinate system. A coordinate conversion unit 305 performs coordinate conversion from the rotating coordinate system into a static coordinate system, and further performs two-phase-to-three-phase conversion, and thus generates voltage command values Vu, Vv, and Vw of the U phase, the V phase, and the W phase from the voltage command values Vd_ref and Vq_ref, and outputs the voltage command values Vu, Vv, and Vw. Note that the coordinate conversion from the rotating coordinate system into the static coordinate system is performed based on an electric angle $\theta\_ref$ output from an angle calculation unit 303. The microcomputer 201 generates the PWM signal to be output to the gate driver 210, based on the voltage command values Vu, Vv, and Vw.

Additionally, current values Iu, Iv, and Iw of U-phase, V-phase, and W-phase coil current detected based on the output of the amplifier 218 by the current value calculation unit 209 are input to the coordinate conversion unit 306. The coordinate conversion unit 306 converts the current values Iu, Iv, and Iw into current values in the static coordinate system by three-phase-to-two-phase conversion, and further performs coordinate conversion from the static coordinate system into the rotating coordinate system, and thus obtains the measurement value Id of excitation current and the measurement value Iq of torque current. Note that the coordinate conversion from the static coordinate system into the rotating coordinate system is performed based on the electric angle $\theta\_ref$ output from the angle calculation unit 303. The coordinate conversion unit 306 outputs the measurement value Id of excitation current and the measurement value Iq of torque current to the current control unit 302.

At the time of activation of the motor 103, a detection unit 301 determines an initial phase of the rotor 502, that is, an electric angle at the time of stopping (hereinafter, stop angle) $\theta\_std$. For instance, the configuration described in US-2015-145454 can be applied to detection of the electric angle at the time of stopping of the rotor 502. In this case, the detection unit 301 detects the stop angle $\theta\_std$ by detecting inductance of each of the coils 213, 214, and 215, based on the current values Iu, Iv, and Iw. The detection unit 301 outputs the stop angle θ_std detected to a subtractor 307. An offset setting unit 304 outputs an offset amount Δ held by the nonvolatile memory 205 to the subtractor 307. The subtractor 307 outputs, to the angle calculation unit 303 as an initial angle θ_ini, an electric angle obtained by subtracting the offset amount Δ from the stop angle θ_std. Note that, to prevent step-out at the time of activation, the electric angle obtained by subtracting the offset amount Δ from the stop angle θ_std is set as the initial angle θ_ini.

The angle calculation unit 303 obtains the electric angle θ_ref of the rotor 502, based on the initial angle θ_ini and a speed command value ω_ref input from the printer control unit 107, and notifies the coordinate conversion units 305 and 306 of the electric angle θ_ref. More specifically, the angle calculation unit 303 obtains the electric angle θ_ref of the rotor 502 by increasing an electric angle, based on the speed command value ω_ref and based on the initial angle θ_ini set as an initial value.

Figure 6:
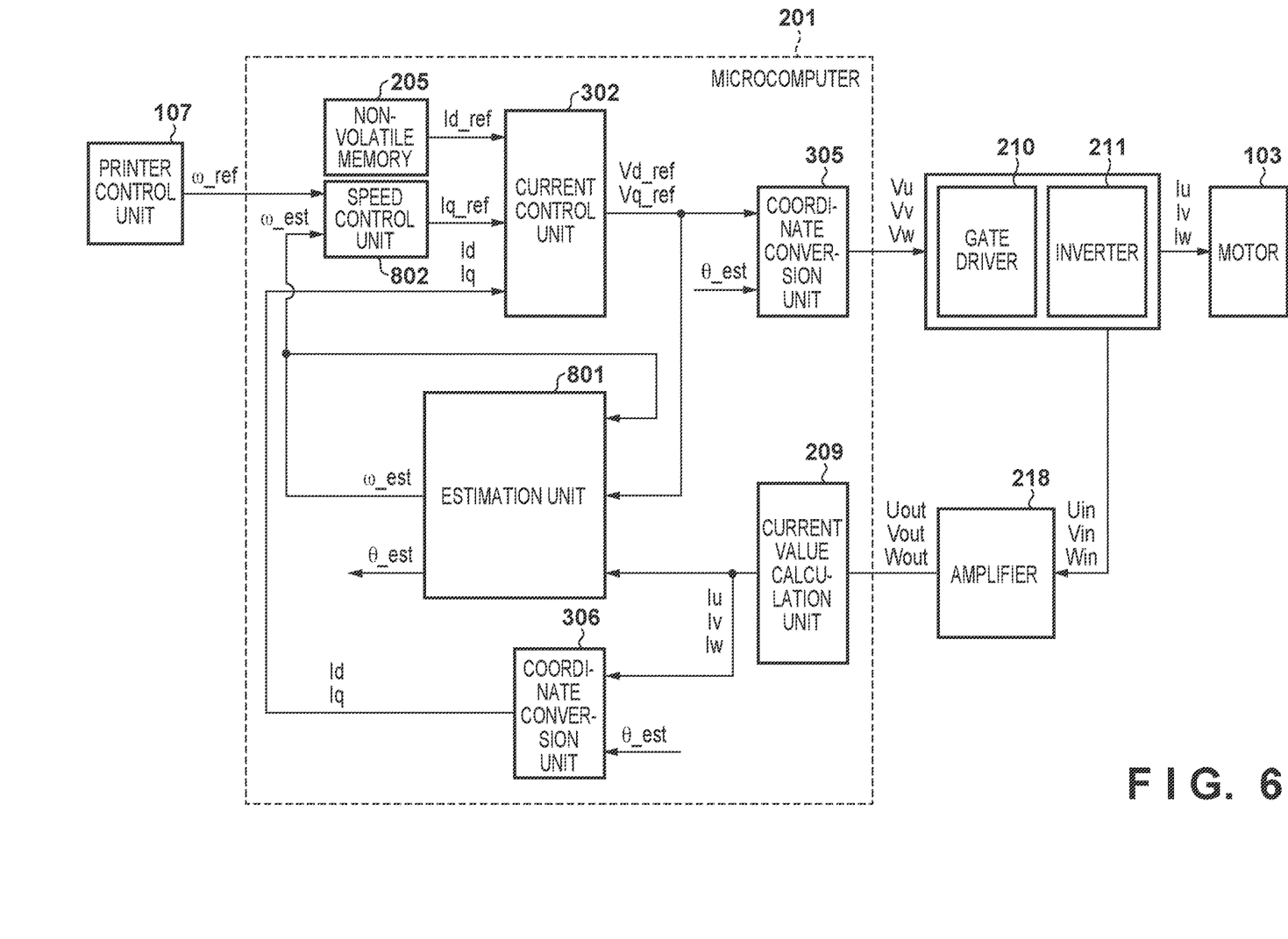
FIG. 6 is a functional block diagram of a microcomputer in sensorless control, according to an embodiment.

FIG. 6 is a functional block diagram of the microcomputer 201 in sensorless control. Note that differences from the functional block diagram in the forced commutation control illustrated in FIG. 5 will mainly be explained below. An estimation unit 801 estimates an electric angle θ_est and rotation speed ω_est of the rotor 502, based on the current values Iu, Iv, and Iw, the voltage command values Vd_ref and Vq_ref, and the rotation speed ω_est estimated. The electric angle θ_est estimated is used for the coordinate conversion in the coordinate conversion units 305 and 306, as with the case of the forced commutation control. Additionally, a speed control unit 802 calculates the command value Iq_ref for causing the rotation speed ω_est to follow the speed command value ω_ref, based on the speed command value ω_ref from the printer control unit 107 and the rotation speed ω_est estimated by the estimation unit 801. Unlike in the forced commutation control, since the speed control unit 802 calculates the command value Iq_ref and outputs the command value Iq_ref calculated to the current control unit 302, the current control unit 302 acquires and uses only the command value Id_ref from the nonvolatile memory 205.

As described above, in the forced commutation control, a predetermined value stored in the nonvolatile memory 205 is used for each of the command values Iq_ref and Id_ref. On the other hand, in the sensorless control, Id_ref is a predetermined value prepared in advance, but the command value Iq_ref is dynamically set based on the rotation speed ω_est estimated by the estimation unit 801 and the speed command value ω_ref. Here, in conventional technology, a command value Id_ref is set to 0 in both forced commutation control and sensorless control, and thus a motor 103 is rotated with high efficiency and high torque.

Figure 7A:
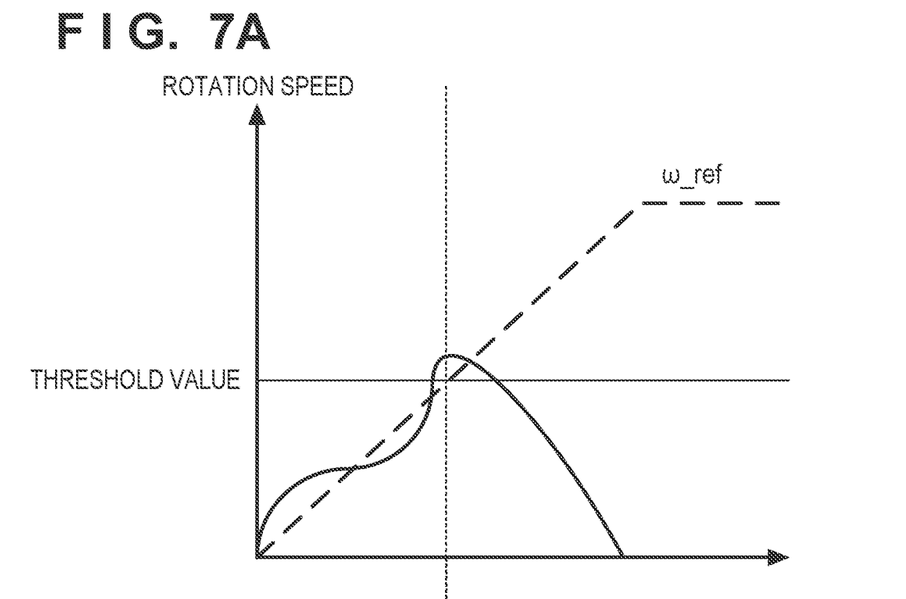
FIGS. 7A and 7B are explanatory views of conventional motor activation processing.
Figure 7B:
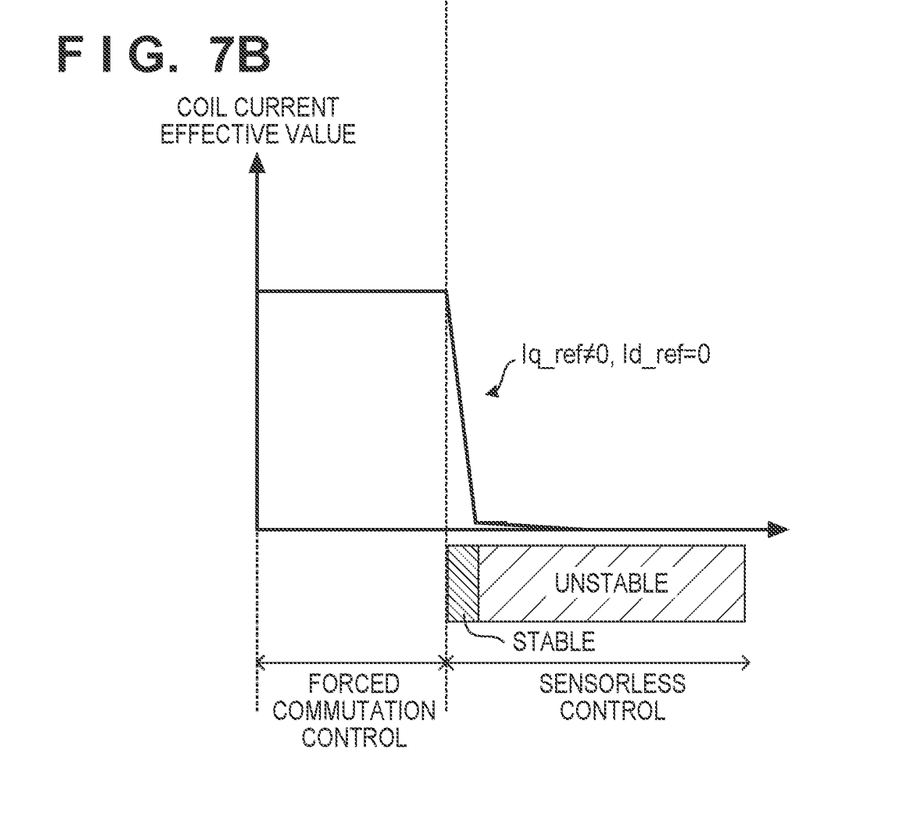

FIG. 7A shows temporal transition of rotation speed of a rotor 502 in the conventional technology, and FIG. 7B shows temporal transition of an effective value of coil current in the conventional technology. As described above, in the conventional technology, the command value Id_ref of excitation current is set to 0 and the excitation current is set to 0, and thus the motor is controlled with high efficiency and high torque. During the forced commutation control, overshooting or undershooting may occur at rotation speed of the rotor 502 with respect to a speed command value ω_ref, in accordance with a load of a motor 103 or the like. When a control method is switched from the forced commutation control to the sensorless control in such a state, torque current may be narrowed depending on a condition of a load, a state of overshooting, and the like. When the torque current is narrowed and the effective value of the coil current becomes small, induced voltage cannot be calculated correctly, and estimation of an electric angle θ_est and rotation speed ω_est of the rotor 502 by an estimation unit 801 becomes unstable. FIGS. 7A and 7B show the case where the estimation of the electric angle θ_est and the rotation speed ω_est becomes unstable, and as a result, activation of the motor 103 fails.

Figure 8A:
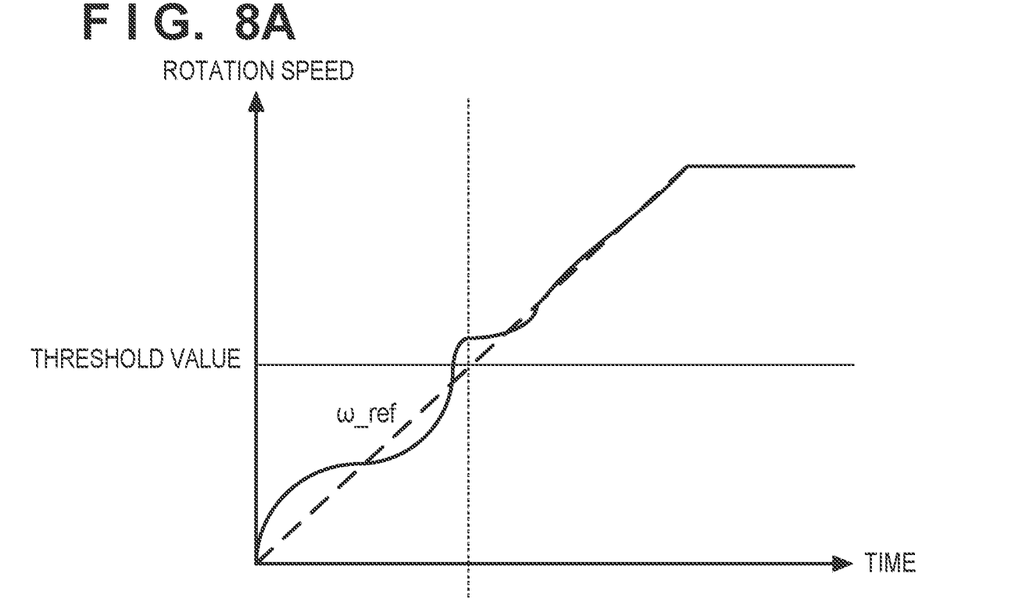
FIGS. 8A and 8B are explanatory views of motor activation processing according to an embodiment.
Figure 8B:
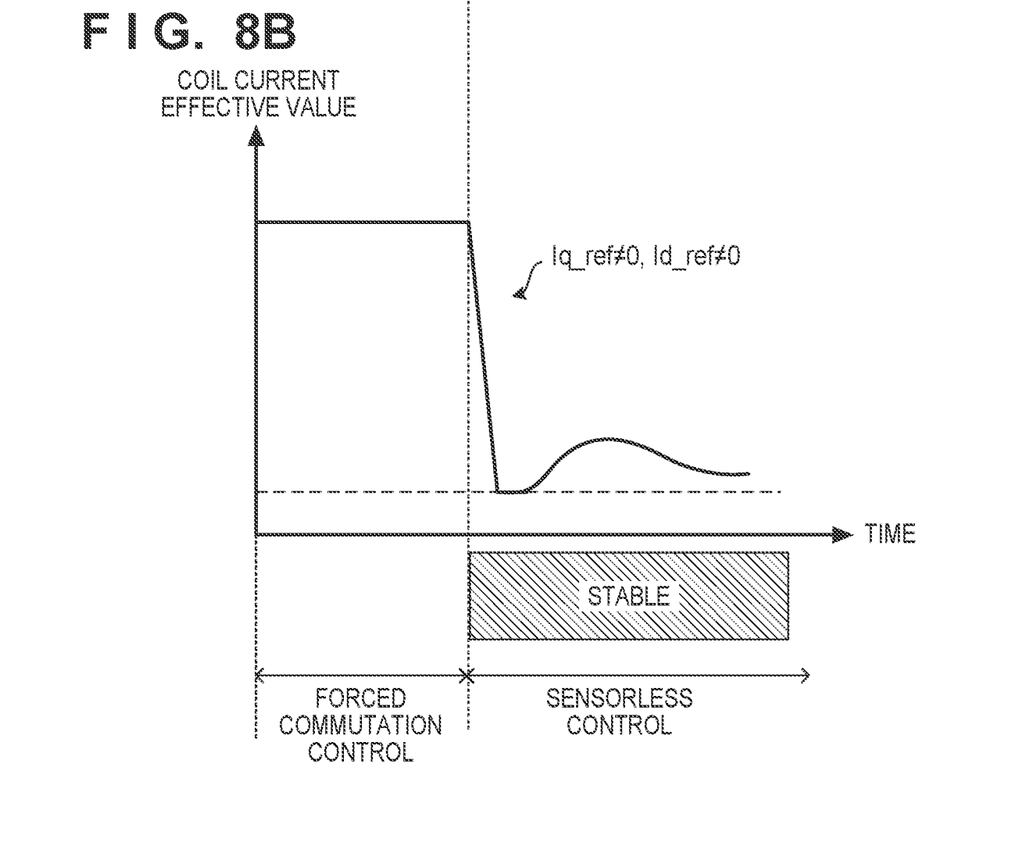

Therefore, in the present embodiment, the command value Id_ref is set to a predetermined value greater than 0 in both the forced commutation control and the sensorless control. Thus, even when torque current is narrowed in switching of the control method from the forced commutation control to the sensorless control, the command value Id_ref is not 0, and thus an effective value of coil current can be prevented from becoming excessively small due to excitation current. Accordingly, as shown in FIGS. 8A and 8B, the estimation unit 801 can stably estimate the electric angle θ_est and the rotation speed ω_est, and can suppress failure of activation of the motor 103.

Note that in the present embodiment, the value of the command value Id_ref is set to the predetermined value, but when the value of Id_ref is set to be excessively great, torque becomes insufficient at the time of a high load, and efficiency may deteriorates. Therefore, there can be made a configuration where the value of the command value Id_ref is determined based on a load of the motor 103. More specifically, there can be made a configuration where, as the load of the motor 103 becomes smaller, the value of the command value Id_ref is set to be greater. Note that as for magnitude of the load of the motor 103, there can be made a configuration where the magnitude is determined based on the measurement value Iq of torque current in previous sensorless control. That is, there can be made a configuration where, as the measurement value Iq of torque current in the previous sensorless control is greater, the value of the command value Id_ref is set to be smaller.

Figure 9:
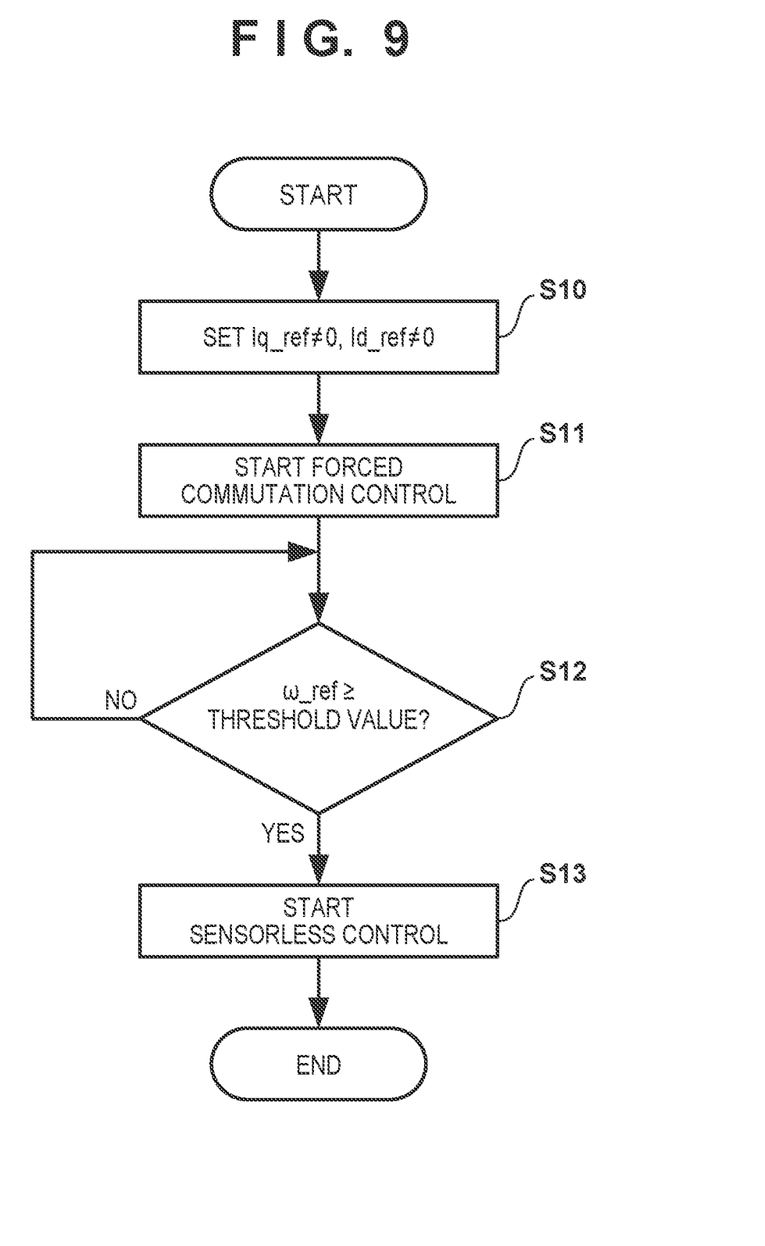
FIG. 9 is a flowchart of motor activation processing according to an embodiment.

FIG. 9 is a flowchart of motor activation processing according to the present embodiment. At S10, the motor control unit 110 sets the command values Iq_ref and Id_ref stored in the nonvolatile memory 205. In the present embodiment, both the command values Iq_ref and Id_ref are values greater than 0. At S11, the motor control unit 110 starts rotation of the motor 103 by the forced commutation control. At S12, the motor control unit 110 continues the forced commutation control until the speed command value ω_ref from the printer control unit 107 becomes equal to or greater than a threshold value that is predetermined speed. After the speed command value ω_ref becomes equal to or greater than the threshold value, the motor control unit 110 switches the control method from the forced commutation control to the sensorless control at S13. Note that the threshold value is a value equal to or greater than rotation speed of the rotor 502 at which the estimation unit 801 can estimate the electric angle θ_est and the rotation speed ω_est, based on induced voltage of the coil.

Second Embodiment

Next, a second embodiment will be explained mainly on differences from the first embodiment. In the first embodiment, the motor control unit 110 sets the command value Id_ref to a value greater than 0 before the activation of the motor 103. In the present embodiment, efficiency is emphasized, and a command value Id_ref is set to 0 before activation of a motor 103. Then, in switching of a control method to sensorless control, the command value Id_ref is set to a value greater than 0 immediately before the switching.

Figure 10:
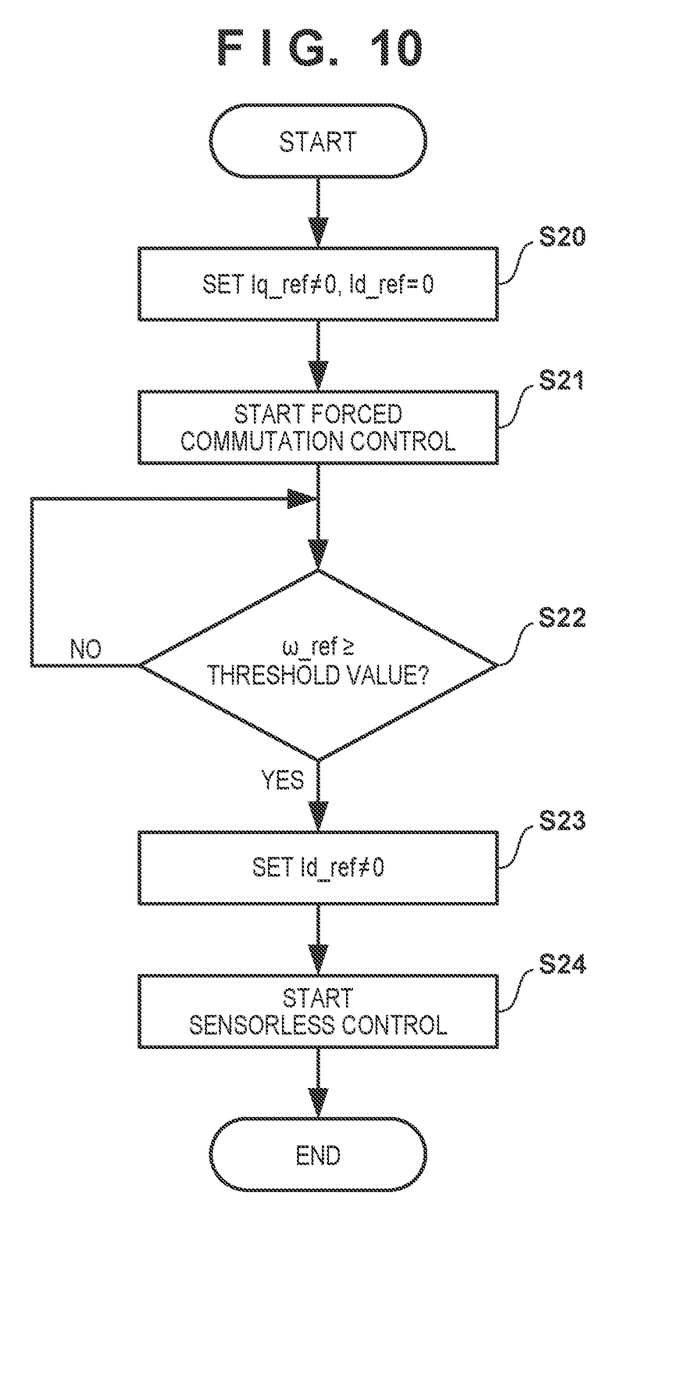
FIG. 10 is a flowchart of motor activation processing according to an embodiment.

FIG. 10 is a flowchart of motor activation processing according to the present embodiment. At S20, a motor control unit 110 sets command values Iq_ref and Id_ref. In the present embodiment, the command value Iq_ref set at S20 is a value greater than 0, but the command value Id_ref set at S20 is 0. At S21, the motor control unit 110 starts rotation of the motor 103 by forced commutation control. At S22, the motor control unit 110 continues the forced commutation control until a speed command value ω_ref from a printer control unit 107 becomes equal to or greater than a threshold value. After the speed command value ω_ref becomes equal to or greater than the threshold value, the motor control unit 110 changes the command value Id_ref to a value greater than 0 at S23. Subsequently, the motor control unit 110 switches the control method from the forced commutation control to the sensorless control at S24.

Others

In the first embodiment, the command value Id_ref is set to a value greater than 0 before the start of the forced commutation control. In the second embodiment, the command value Id_ref is set to 0 before the start of the forced commutation control, and the command value Id_ref is set to a value greater than 0 immediately before the switching of the control method to the sensorless control. However, there can be made a configuration where, after the command value Id_ref is set to 0 and the forced commutation control starts, the command value Id_ref is set to a value greater than 0 at any timing before the switching of the control method to the sensorless control. Note that, after the command value Id_ref is set to a value greater than 0 and the control method is switched to the sensorless control, the motor control unit 110 maintains a value of the command value Id_ref at the value greater than 0 at least until a predetermined period elapses. There can be made a configuration where, after the predetermined period elapses, the command value Id_ref is changed to 0. Alternatively, the command value Id_ref can also be maintained at the value greater than 0 even after the predetermined period elapses. The predetermined period is determined in advance based on a period in which influence of overshooting and undershooting at the time of the forced commutation control continues after the switching of the control method to the sensorless control. Additionally, at S12 of FIGS. 9 and S22 of FIG. 10, it is determined whether or not the speed command value ω_ref is equal to or greater than the threshold value, but there may be made a configuration where it is determined whether or not the speed command value ω_ref is greater than the threshold value.

Note that in each of the above-described embodiments, the motor control unit 110 is described as a component of the image forming apparatus, but the motor control unit 110 can also be a motor control apparatus as one apparatus. Additionally, an apparatus including the printer control unit 107 and the motor control unit 110 can also be a motor control apparatus. Additionally, in the above-described embodiments, the motor 103 is a motor that rotates the photoreceptor 102, but the configuration of the present disclosure can also be applied to a motor that drives an arbitrary rotating member in the image forming apparatus. Additionally, the configuration of the motor 103 is not limited to the configuration illustrated in FIG. 4, and may be a motor having other number of poles or other number of phases.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-053630, filed Mar. 26, 2021, which is hereby incorporated by reference herein in its entirety.

What is claimed is:

1. A motor control apparatus comprising:
    a current supply unit configured to supply coil current to a plurality of coils of a motor by controlling, based on a first command value of excitation current and a second command value of torque current, voltage to be applied to the plurality of coils;
    a first setting unit configured to set the first command value;
    a second setting unit configured to set the second command value; and
    a control unit configured to use first control in starting of rotation of a rotor of the motor, and switch control to second control after rotation speed of the rotor becomes greater than predetermined speed, wherein
    the first setting unit is further configured to set a value greater than 0 as the first command value before the control unit switches control from the first control to the second control, and
    the second setting unit is further configured to set a value greater than 0 as the second command value while the control unit is performing the first control.

2. The motor control apparatus according to claim 1, wherein the first setting unit is further configured to set a value greater than 0 as the first command value before the control unit starts the first control.

3. The motor control apparatus according to claim 1, wherein the first setting unit is further configured to set 0 as the first command value before the control unit starts the first control, and set a value greater than 0 as the first command value before the control unit switches control from the first control to the second control.

4. The motor control apparatus according to claim 3, wherein
the first setting unit is further configured to set 0 as the first command value before the control unit starts the first control, and set a value greater than 0 as the first command value when rotation speed of the rotor becomes greater than the predetermined speed, and
the control unit is further configured to switch control from the first control to the second control after a value greater than 0 is set as the first command value.

5. The motor control apparatus according to claim 1, wherein the first setting unit is further configured to maintain a value greater than 0 set as the first command value until at least a predetermined period elapses after the control unit switches control from the first control to the second control.

6. The motor control apparatus according to claim 1, further comprising
a determination unit configured to determine a current value of the torque current, based on the coil current used while the control unit is performing the second control, wherein
the first setting unit is further configured to determine the value of the first command value greater than 0, based on the current value of the torque current determined by the determination unit.

7. The motor control apparatus according to claim 6, wherein the first setting unit is further configured such that as the current value of the torque current is greater, the value of the first command value greater than 0 is set to be smaller.

8. The motor control apparatus according to claim 1, wherein
the first control is control performed by determining a rotation phase of the rotor, based on an initial phase when the rotor is stopped and based on a command value of rotation speed of the rotor, and
the second control is control performed by determining a rotation phase of the rotor, based on induced voltage of the plurality of coils.

9. An image forming apparatus comprising:
a rotating member for conveying a sheet along a conveyance path;
an image forming unit configured to form an image on the sheet conveyed in the conveyance path;
a motor that drives the rotating member or the image forming unit; and
a motor control unit configured to control the motor, wherein
the motor control unit comprises:
a current supply unit configured to supply coil current to a plurality of coils of the motor by controlling, based on a first command value of excitation current and a second command value of torque current, voltage to be applied to the plurality of coils,
a first setting unit configured to set the first command value,
a second setting unit configured to set the second command value, and
a control unit configured to use first control in starting of rotation of a rotor of the motor, and switch control to second control after rotation speed of the rotor becomes greater than predetermined speed, and
wherein the first setting unit is further configured to set a value greater than 0 as the first command value before the control unit switches control from the first control to the second control, and
the second setting unit is further configured to set a value greater than 0 as the second command value while the control unit is performing the first control.

* * * * *